July 20, 1965 J. A. CLARK 3,195,252
SLIDE PROJECTOR TRANSFER MECHANISM WITH STOP MEANS
Original Filed Feb. 16, 1959 2 Sheets-Sheet 1

INVENTOR.
JAMES A. CLARK
BY
ATTORNEYS

3,195,252
SLIDE PROJECTOR TRANSFER MECHANISM WITH STOP MEANS

James A. Clark, Brighton, N.Y., assignor to Bausch & Lomb Incorporated, Rochester, N.Y., a corporation of New York
Original application Feb. 16, 1959, Ser. No. 793,569, now Patent No. 3,114,806, dated Dec. 17, 1963. Divided and this application May 10, 1961, Ser. No. 109,144
2 Claims. (Cl. 40—36)

This is a division of my copending application Serial No. 793,569, filed February 16, 1959, now Patent No. 3,114,806 issued December 17, 1963.

The present invention relates to projection apparatus and, more particularly, to a slide projector projecting transparencies such as slides.

In instruments of this general character, there is usually employed a number of integrated mechanisms which cooperate to perform the desired result of semi-automatic or automatic projection. To this end, there is usually provided a slide pickup and return mechanism, an automatic timer control, a slide tray indexing or feeding device, and a circuit having various switches which are actuated in predetermined sequences to maintain automatic action. The present invention contemplates an improved combination of a motor, slip drive connection, and interference stop, and means to improve the stop by a stray magnetic field. Therefore, it is the principal object of the present invention to provide an improved automatic slide projector embodying various improved features inherent therein.

Figure 1:
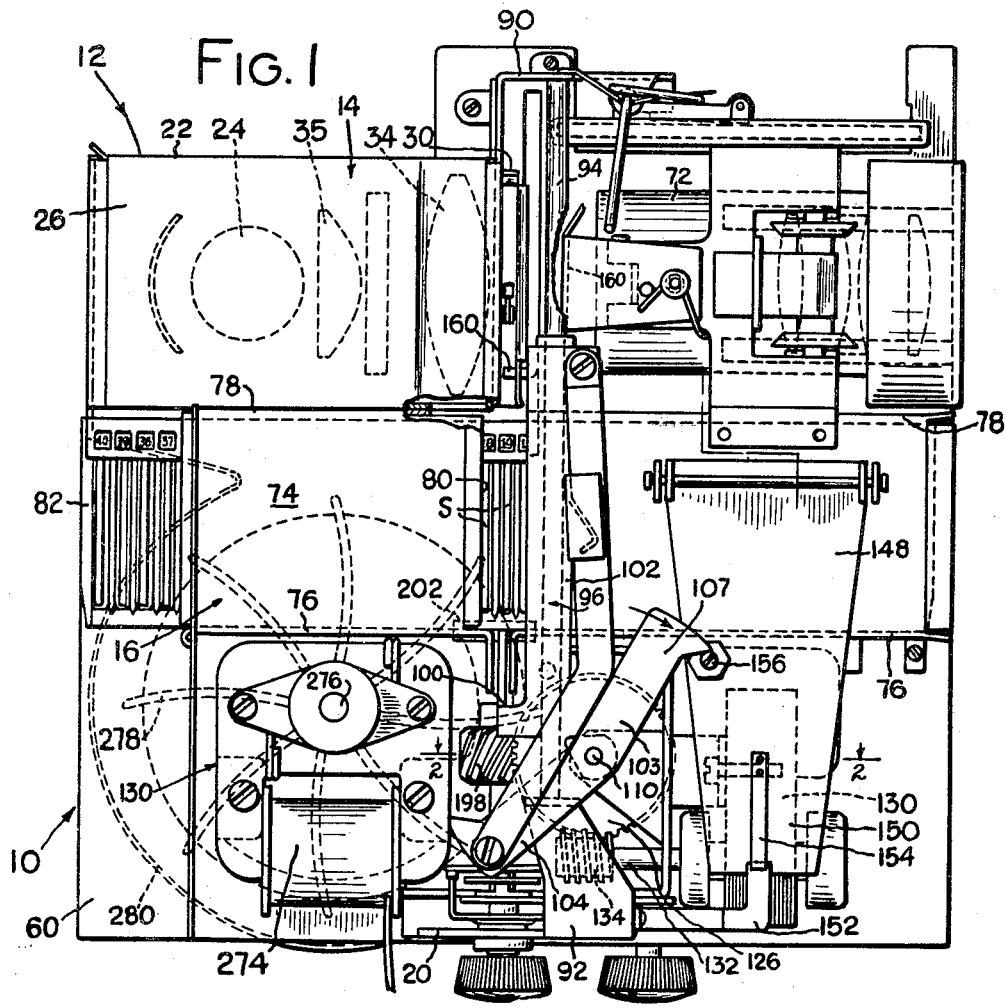
Figure 2:
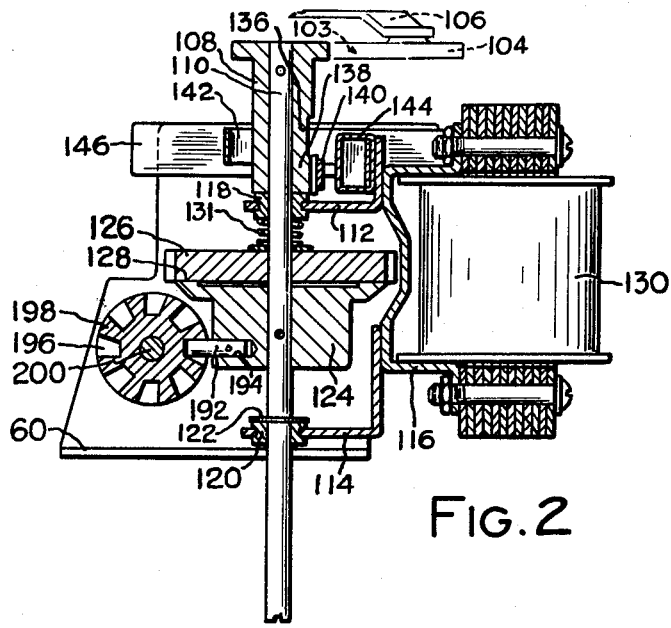

FIG. 1 is a plan view of a projector;
FIG. 2 is a partial sectional view taken along the line 4—4 in FIG. 1.

Referring to the drawings and more particularly to FIGS. 1 and 2, there is shown a slide projector having a base 10 for mounting a suitable decorative cover cabinet (not shown) and for mounting the various mechanisms of the present invention. Arranged on the base 10 is a light source 12, a projection system 14, a slide tray holder 16, slide pickup and a control panel 20 for supporting various electrical control devices.

The light source 12 is shown as including a housing or shield 22 which is suitably mounted on the base 10 and serves to protect a conventional projector lamp 24. The housing has a top plate 26, and a slide receptacle 30 for holding a slide S when the same is in projection position. Light is projected from the lamp 24 by a system of condensing lenses 34, 35. The lenses 34, 35 and the lamp 24 are mounted in a cell which is contained in the housing 22 and is adapted for sliding and pivotal movement relative thereto.

As noted in FIG. 2, the axis of the projection system comprising the lamp 24, the lenses 34, 35 and the tube 72 is slightly offset with respect to the center line of the base 10 in order to accomodate a tray carrying a plurality of slides. Immediately adjacent to the projection system and having its axis parallel with the axis of the projection system is the slide tray holder 16 which is suitably mounted on the deck 60 of the base 10. As shown in FIG. 2, the tray holder is formed as an integral three-sided longitudinally extending box having a top 74 and two sides 76, 78. Actually, the holder 16 comprises two identical box-like structures in axial alignment and provided with an open area or slot between adjacent ends for permitting egress and ingress of slide transparencies. This is seen in FIG. 2, where a slot 80 is located intermediate the ends of the holder 16. For purposes of this invention and further description thereof, the holder is considred to be a unitary structure formed with a slot intermediate its ends.

The slide tray holder is designed to slidably support a slide tray 82 which may be inserted at one end of the holder (left as viewed in FIG. 2) and drawn out at the other end.

The slide pickup and return mechanism comprising a slide transfer device will now be described in detail. Mounted adjacent to the opposing sides of the base 10 and in a transverse plane with respect to the axis of the tray holder 16 is a pair of uprights 90, 92 which serve to support the mechanism above the base 10. Each of the uprights 90, 92 is provided with an opening, respectively, for receiving one end of a slide rod 94. A U-shaped slide transfer element 96 is slidably mounted on the rod 94 and is provided with downwardly depending leg portion 100, integrally formed at the ends of the bight portion 102 of the element. Suitable openings formed in the leg portion 100 are adapted to receive the rod 94 for permitting sliding movement thereon. It will be apparent that the transfer element 96 is movable between two positions on the rod 94, that is, between a projection position and a pickup or return position shown in FIG. 2.

Reciprocable movement of the transfer element 96 on the rod 94 is effected by means of a drive mechanism which includes a rotatable crank 103 having an arm 104. The crank 103 is also provided with a second arm 107 positioned at 180° from the arm 104 and is made integral on a sleeve. This sleeve is mounted on a shaft 110 held in a vertical position by a pair of vertically spaced bearing supports 112, 114 secured to an upwardly extending support 116 secured to the base 10. As shown in FIG. 2, each of the supports 112, 114 is provided with a bearing 118, 120, respectively, in which the shaft 110 is slidably received. The lower end of the shaft has secured thereto a washer 122 which slidably rests upon the bearing 120 for preventing the shaft from falling downwardly in its support. Also secured to the shaft 110 is a clutch sleeve 124 located between the bearings 118, 120, and immediately above this sleeve is a gear 126 which slidably receives the shaft 110. A circular surface 128 on the sleeve 124 is adapted to engage the adjacent face of the gear 126 for imparting rotation to the former during positive driving of the latter. A light coil spring 131, held in compression between the upper bearing 118 and the gear 126, serves to maintain the frictional engagement between the sleeve clutch surface 128 and the gear 126.

Rotation of the shaft 110 and consequently the crank arm 104 is effected by an electric motor 130 having a drive shaft 132 and a worm gear 134 connected thereto and in operative engagement with the gear 126. Upon rotation of the shaft 132, the gear 126 will be correspondingly rotated and because of the spring induced frictional engagement between the gear 126 and the clutch sleeve 124, the rotation will be imparted to the shaft 110. During operation of the projector, there are occasions when the rotation of the shaft 110 is abruptly stopped and before the motor shaft 132 is able to come to a complete stop for reasons of the inertial effects on the armature of the motor 130. In these events, the rotation of the gear 126 would have stopped along with the rotation of the shaft 110, however, rotation of the sleeve 124 may continue for a short duration while the motor 130 is coming to rest. In effect then, the slippage connection between the gear 126 and the sleeve 124 allows the motor to come to a gradual stop rather than an abrupt stop, thereby eliminating damage thereto.

As shown in FIG. 2, a pair of vertically spaced cams 136, 138 are made integral with the sleeve 108 and each of these cams is cooperable with a leaf spring lever 140, 142. The lever 140, when flexed by the cam 136, opens a normally closed load limit switch 144 while the lever 142, when flexed by the cam 138, opens a normally closed projection limit switch 146.

Abrupt braking of the rotation of the crank 103 when the transfer element 96 is in either the projection or pickup positions is accomplished by means of an armature in the form of a plate 148 pivotally mounted at one end to the top 74 of the tray holder 16. The other end 150 of the plate 148 extends over the motor 130 and is adapted for limited arcuate movement in a vertical plane between a stop member 152 secured to the frame of the motor and extending over the end 150 and the motor itself. A leaf spring 154 secured at one end to the top of the armature 148 and engageable with the top of the stop 152 prevents sudden slamming of the armature against the motor while at the same time continuously biasing the end 150 in an upward direction against the stop 152. A pin 156 is secured to the upper surface of the armature 148 and is cooperable with the ends of each of the arms 104 and 107 for braking rotation of the crank 103. When the motor 130 is energized for rotating the gear 126, the magnetic flux surrounding the motor is sufficient to attract the armature 148 for rotating the same downwardly against the bias of the spring 154. This movement of the armature will be sufficient to clear the engagement of the pin 156 with respect to either of the arms 104, 107 and thereby permit rotation of the gear 126. When the motor 130 is deenergized, the armature will be forced upwardly for carrying the pin 156 in the path of either of the arms 104, 107 whereupon the rotation of the crank 103 and consequently the gear 126 will be positively and abruptly stopped. The mechanical relationship between the transfer element 96, the link 106, the crank 103 and the pin 156 is such that this positive stoppage occurs when the transfer element is in either of its extreme positions on the rod 94.

It will be apparent from the foregoing description that rotation of the crank 103 will cause reciprocation of the transfer element 96 between a slide pickup or return position to a projection position opposite the slide receptacle 30 of the projection system. The depending leg 100 has secured at its lower end a pad 160 for engaging a slide when the transfer element is moving to the projection system.

As previously stated, the rotation of the shaft 110 will impart rotation to the clutch sleeve 124. Radially projecting from the sleeve 124 is an actuator pin 192 secured within a bore 194 and being adapted for rotation about the axis of the shaft 110 during rotation of the latter. The pin 192 is adapted to be received within any one of a plurality of grooves 196 of a helical index gear 198 secured to a shaft 200 rotatably mounted horizontally on the panel 20. A gear 202 secured to one end of the shaft 200 is cooperable with the rack on the tray 82. The pitch of the grooves 196 on the helical gear 198 is such that rotation of the latter an angular distance equal to the pitch will advance the tray 82 a distance equal to the distance between two adjacent slides S. For every full rotation of the clutch sleeve 124, the pin 192 will be received within and slide along one of the grooves 196 for rotating the gear 198 and advance the tray.

A cooling system for the lamp 24 and a heating system for preheating the slides before they are projected are provided in the present projector. As shown in FIG. 2, the base 10 has mounted on the deck thereof an electric motor 274 which serves to rotate a shaft 276 extending vertically downwardly through the deck. A radial flow impeller or fan 278 is mounted and secured to the remote lower end of the shaft and upon rotation of the fan, air is drawn into the base 10 and forced therethrough as shown by the arrows.

A generally circular baffle 280 is mounted within the base 10 for controlling the flow of air to the open floor of the lamp housing 22. Air is thus forced upwardly through the housing and is expelled through open louvers formed in the rear wall of the housing. In so moving, the air will cool the lamp 24, the heat-absorbing plate 48 and the lenses 34, 35.

I claim:

1. A drive mechanism for driving a relatively low inertia load having means for abruptly stopping the load comprising an electric motor generating a stray magnetic field, means energizing said motor and a drive train connecting the load and said motor, said drive train including a slip clutch connection between said motor and the load, an interference stop mounted for movement alternately into and out of interference with the drive train on the load side of said clutch, yieldable means for urging said stop into interference, a magnetic member mounted adjacent to said motor and connected to said stop, said magnetic member operating in response to the stray magnetic field for moving said stop out of interference in response to and holding said stop out of interference during energization of said motor, means breaking the connection between said motor and said energizing means to thereby deenergize said motor, and said slip clutch permitting said motor to overrun and dissipate its inertial energy after said stop brings the load to an abrupt halt.

2. A slide transfer mechanism for an automatic slide projector or the like comprising a relatively light reciprocatable transfer arm for moving slides between two spaced positions in the projector, a rotatable member connected to said arm for reciprocating it, an electric motor generating a stray magnetic field and rotating said member, means energizing said motor, a drive train including a slip clutch connecting said motor and said member, an abutment stop movable into and out of the path of said member, means normally urging said stop into the path of said member, a magnetic actuator adjacent to said motor and connected to said stop, said magnetic member operating in response to the stray magnetic field for moving said stop out of the path of said member in response to and holding said stop out of the path during energization of said motor, means breaking the connection between said motor and said energizing means, and said slip clutch drive connection permitting said motor to overrun and dissipate its inertial energy after said stop brings said member to an abrupt halt upon deenergization of said motor.

References Cited by the Examiner

UNITED STATES PATENTS

| | | | |
|---|---|---|---|
| 2,479,975 | 8/49 | Shively | 192—142 |
| 2,629,475 | 2/53 | Hooker | 192—142 |
| 2,646,519 | 7/53 | Kalikow et al. | |

DAVID J. WILLIAMOWSKY, *Primary Examiner.*

THOMAS J. HICKEY, *Examiner.*

UNITED STATES PATENT OFFICE
CERTIFICATE OF CORRECTION

Patent No. 3,195,252                                  July 20, 1965

James A. Clark

It is hereby certified that error appears in the above numbered patent requiring correction and that the said Letters Patent should read as corrected below.

Column 1, line 34, for "4-4" read -- 2-2 --; same column 1, lines 53, 61 and 67, column 2, lines 3 and 21, and column 3, line 63, for "FIG. 2", each occurrence, read -- FIG. 1 --; column 1, line 70, for "considred" read -- considered --; column 2, line 16, after "element" insert -- 96 --.

Signed and sealed this 22nd day of February 1966.

(SEAL)
Attest:

ERNEST W. SWIDER                                  EDWARD J. BRENNER
Attesting Officer                                     Commissioner of Patents